US006458185B1

(12) United States Patent
Reiter et al.

(10) Patent No.: US 6,458,185 B1
(45) Date of Patent: Oct. 1, 2002

(54) RECOVERY OF VOLATILE ORGANIC COMPOUNDS FROM CARBON ADSORBER BEDS

(75) Inventors: Timothy D. Reiter, Sherwood Park (CA); Stephen C. Jones, Mobile, AL (US)

(73) Assignee: Celanese Acetate LLC, Charlotte, NC (US)

( * ) Notice: Subject to any disclaimer, the term of this patent is extended or adjusted under 35 U.S.C. 154(b) by 0 days.

(21) Appl. No.: 09/821,217

(22) Filed: Mar. 29, 2001

(51) Int. Cl.$^7$ .............................................. B01D 53/04
(52) U.S. Cl. ............................. 95/115; 95/141; 95/148
(58) Field of Search ............................. 95/96, 97, 104, 95/106, 112, 115, 141, 143, 144, 148; 502/55

(56) References Cited

U.S. PATENT DOCUMENTS

| | | | |
|---|---|---|---|
| 3,274,755 A | * | 9/1966 | Montagnon et al. |
| 4,480,393 A | * | 11/1984 | Flink et al. |
| 5,230,872 A | * | 7/1993 | Tiggelbeck et al. |
| 5,259,858 A | * | 11/1993 | Terry et al. |
| 5,362,402 A | * | 11/1994 | Hatiko et al. ................ 210/757 |
| 5,702,505 A | * | 12/1997 | Izumi et al. ................... 95/143 |
| 5,779,768 A | * | 7/1998 | Anand et al. .................. 95/141 |
| 6,037,291 A | * | 3/2000 | Buckley et al. ............... 95/115 |

FOREIGN PATENT DOCUMENTS

RU 2138586 * 9/1999

OTHER PUBLICATIONS

Kirk–Othmer, *Encyclopedia of Chemical Technology*, vol. 1 (New York: John Wiley & Sons, 1996), pp. 493–528 and 529–573.
C. L. Mantell, *Adsorption* $2^{Nnd}$ Ed. (New York: McGraw–Hill Book Company, 1951), pp. 224–254.
John W. Hassler, *Activated Carbon*, (New York: Chemical Publishing Company 1963), pp. 55–66.

* cited by examiner

Primary Examiner—David A. Simmons
Assistant Examiner—Frank M. Lawrence
(74) Attorney, Agent, or Firm—Walter M. Douglas; Robert H. Hammer III

(57) ABSTRACT

A process for the recovery of a volatile organic compound (VOC) from a process stream by use of a bed of activated carbon is disclosed. In the first step, VOC laden gas passes through to the bed, in a first direction. In the second step, steam passes through the bed in a second direction. The first direction is opposite to the second direction. In the final step, cooling gas, ambient atmospheric air, passes through the bed in the second direction. This process yields greater VOC recovery efficiency and longer cycle life for the bed of activated carbon.

4 Claims, 3 Drawing Sheets

RECOVERY OF VOLATILE ORGANIC COMPOUNDS FROM CARBON ADSORBER BEDS

FIELD OF THE INVENTION

This invention is directed to the recovery of volatile organic compounds from activated carbon adsorption beds. In particular, the invention is directed to an improved method of regenerating the activated carbon to thereby improve on-line time and the percentage of volatile organic compounds recovered from carbon adsorption beds.

BACKGROUND OF THE INVENTION

Carbon adsorption beds are widely used in many industries to remove volatile organic compounds from process gas streams; for example, air or nitrogen streams. In a typical carbon bed operation, a process gas stream containing volatile organic compounds ("VOCS") is passed at through the carbon bed at a selected temperature and pressure. The VOCS are adsorbed from the gas stream onto the carbon particles of the bed. Frequently, monitoring devices selective to the VOCS sought to be removed are placed on the outlet side of the carbon bed during the adsorption process. When the bed ceases to adsorb VOCS, a breakthrough is detected indicating the carbon bed is saturated and the process gas stream is diverted to a second carbon bed. The saturated carbon bed is then either unloaded and disposed of in an approved manner or, more economically, the carbon bed is regenerated for future on-line use and the VOCS recovered for recycling, disposal or fuel use depending on the type of VOCS.

In a simplified example of regenerating a carbon bed for additional use, the regeneration is carried out by passing steam at a selected temperature and pressure through the carbon bed, condensing the steam and any stripped VOCS on the outlet side of the bed, and recycling or venting effluent gases after condensation. The steam stripping is typically performed countercurrent to the inlet/outlet direction of the carbon bed during the adsorption phase. After the steam stripping is completed, the carbon bed is cooled by the passage of cooling gas through the bed, typically in the same direction as the VOCS were passed through the bed during the adsorption phase. Once cooling is completed, the carbon bed is placed in a "ready position" for on-line use when the bed currently on-line is saturated.

A thorough discussion of adsorption, carbon beds, and regeneration can be found in Kirk-Othmer: Encyclopedia of Chemical Technology, 4th Ed. (New York: John Wiley & Sons), Vol 1, pages 493–528 (adsorption in general); Vol 1, pages 529–573 (adsorption, gas separation) and Vol. 4, pages 1015–1037 (activated carbon and its uses). Additional information can be found in C. L. Mantell, ADSORPTION 2nd Ed. (New York: McGraw-Hill Book Company, 1951), pages 224–254; and John W. Hassler, Activated Carbon (New York: Chemical Publishing Company 1963), pages 55–66. The Mantell work, on pages 241–244, specifically describes a prior art acetone recovery unit.

It is the object of this invention to provide an improved process for regenerating carbon adsorption beds to optimize both the recovery of volatile organic compounds adsorbed on the bed and the operating capacity of the carbon bed when it is returned to on-line use.

It is a further object of this invention to provide improved process for regenerating carbon adsorption beds whereby the carbon beds are cooled in a direction opposite to the normal inlet-outlet direction which the bed is operated to thereby optimize both the recovery of volatile organic compounds adsorbed on the bed and the operating capacity of the carbon bed when it is returned on-line by providing for a outlet-to-inlet cooling

SUMMARY OF THE INVENTION

The invention describes a process for the removal of one or a plurality of volatile organic compounds from a process gas stream containing same by the use of an activated carbon containing unit and regenerating the carbon of said unit, said process comprising the steps of:

passing a process gas containing one or a plurality of volatile organic compounds ("VOCs") capable of being adsorbed on an activated carbon though an activated carbon containing unit to thereby adsorb the volatile organic compounds onto said carbon, said passage being for a selected time at a selected temperature and pressure for a selected time;

shutting off the flow of process gas to the unit and passing steam for a selected time at a selected temperature and pressure through the unit in a direction opposite to direction of the flow of the volatile organic compounds containing process gas to thereby desorb said volatile organic compounds from the activated carbon;

condensing the steam and volatile organic compounds, and separating recovering same;

shutting off the flow of steam to the unit and passing atmospheric air through the unit at a selected pressure and for a selected time, the air being passed through the unit in the same direction as the steam was passed through the unit and not, as in the case of the prior art, in the same direction as was the VOC-laden process air passed through the unit, to thereby dry the carbon contained therein and lower its temperature to a selected temperature; and returning said unit to on-line operating status.

DETAILED DESCRIPTION OF THE INVENTION

The invention as described herein can be used with any VOC capable of being adsorbed on a carbon bed and desorbed therefrom during a regeneration cycle by the use of steam and/or a gas non-reactive with the VOC. Example of non-reactive gases include nitrogen, argon and similar gases. In particular, the invention is useful with VOCS having a boiling point less than 100° C.; for example, acetone, methylene chloride, methyl ethyl ketone, ethyl alcohol and similar VOCS. Most particularly, the invention described herein is useful for the recovery of the solvents used in the preparation of cellulose acetate filaments, fibers and films. In the examples herein acetone is used as the model VOC and its use is not intended to limit the invention in an manner.

In the examples given herein the carbon adsorption units are shown in the vertical position. However, such units can also be operated in the horizontal position. No significance is to be attached to the positioning of the units.

The description and examples given herein are based on a process for the preparation of cellulose acetate filament. Methods of preparing cellulose acetate filaments are well known to those skilled in the art and are very briefly summarized as follows. Basically, a solution or "dope" of cellulose acetate in a solvent is prepared and spun through a spinneret into a spinning cabinet from whence it is it drawn, dried and wound on a core (for use in making fabrics) or gathered with a plurality of similar filament to form a tow of filaments which is then baled for various uses. While in the spinning cabinet a flow of warmed air at a temperature is drawn through the cabinet to aid in solvent evaporation and thereby cause the filament to form within the cabinet. The air flowing through the cabinet is then cooled, passed through a blower (whereby it is re-warmed) and re-cooled. This cooled air is then sent to an activated carbon adsorption bed wherein the solvent is adsorbed onto the carbon. When the capacity of the carbon adsorption bed is reached, the bed is taken off-line and regenerated as follow according to methods of the prior art and the invention herein.

Figure 1:
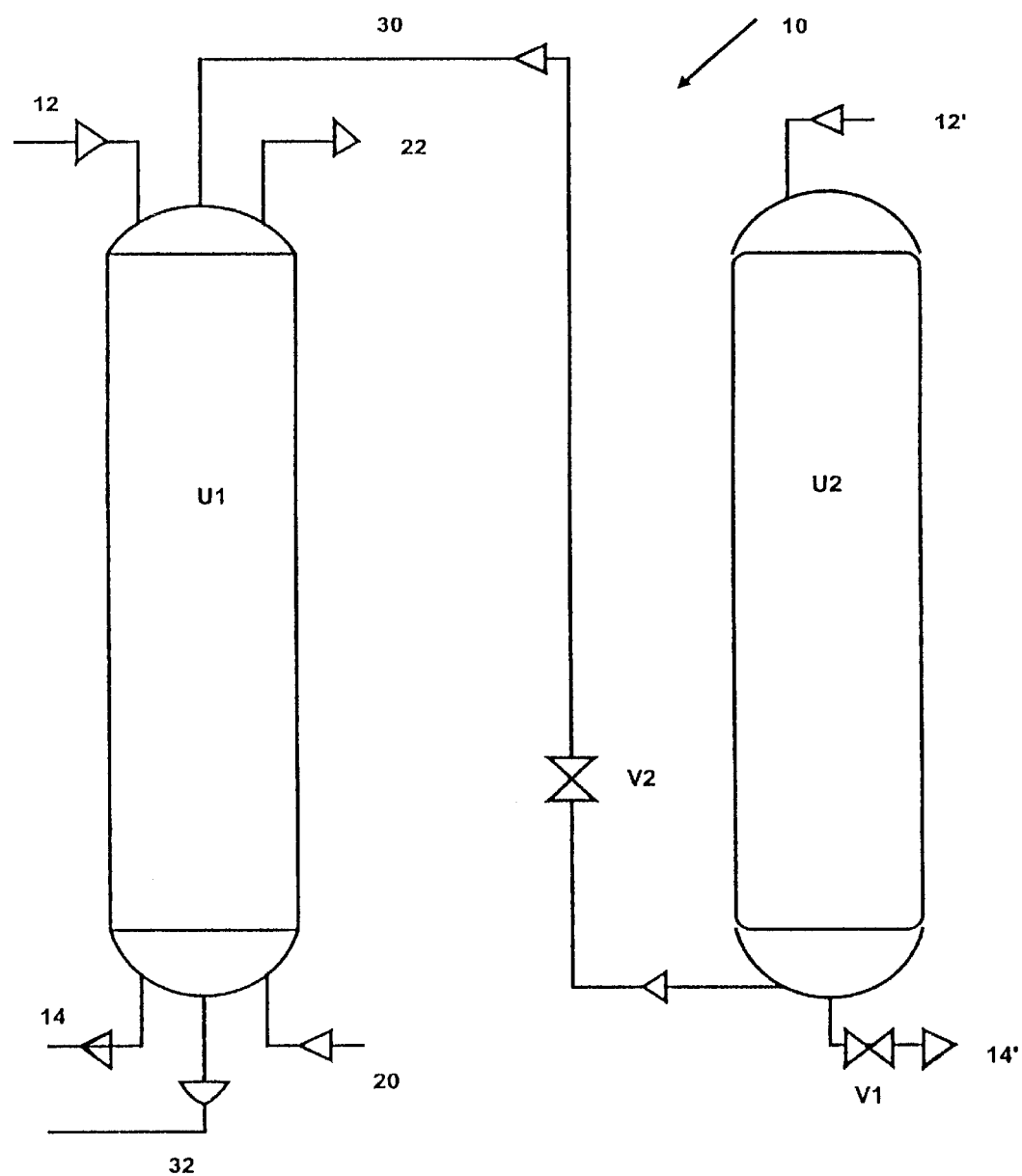
FIG. 1 a simplified illustration of a swing-bed carbon adsorption system as operated and regenerated under the prior art methods.
Figure 2:
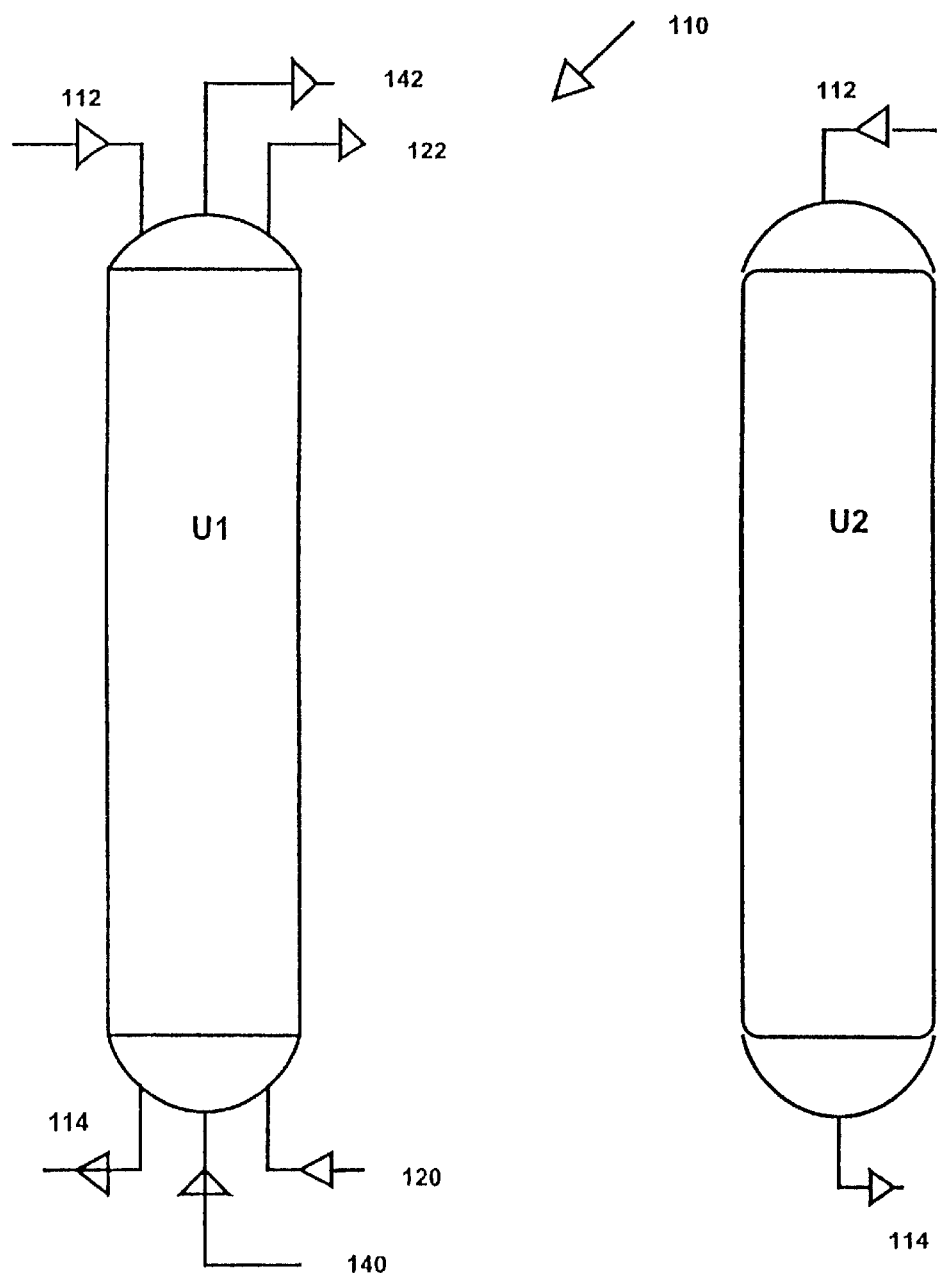
FIG. 2 is a highly simplified illustration of a swing-bed carbon adsorption system as operated and regenerated in accordance with this invention.

FIGS. 1 and 2 are highly simplified illustrations, showing only the piping and any associated equipment necessary to understand the prior art process and the process of the invention. Many valve, other piping, blowers and other associated equipment are not illustrates for simplicity. Detailed illustrations of actual carbon adsorption unit as actually used commercially for acetone recovery in a cellulose acetate spinning process are shown in Mantell, op. cit., at page 242, FIG. 123, and in Hassler, ibid. at page 58, FIG. 3:2. Both Mantell and Hassler are incorporated herein by reference.

In the experiments used to generate the data in Table 1 below and for FIG. 3, the VOC content of the simulated spinning process air being treated was approximately 18,000 ppm at a temperature of approximately 30° C., a pressure of approximately 15.1 psia and an air velocity (feed rate) of approximately 75 cfm (cubic feet per minute). Regeneration was carried out using 150° C. steam admitted at a rate of approximately 2.8 lb/hr for approximately 15 minutes. Generally, steam at a temperature in the range of 130–180° C. and a pressure in the range of 10–25 pounds over atmospheric pressure can be used in practicing the invention. While generally the steaming time is in the range of 10 minutes to 1 hour, the time can be extended in accordance with the size of the unit.

Cooling was carried out using (a) on-line carbon unit effluent air as illustrated in FIG. 1 (prior art example) and (b) atmospheric air as illustrated in FIG. 2 (the invention). The carbon bed was cooled for a selected time sufficient for the temperature of the carbon bed to reach a temperature in the range of 20–25° C. below the boiling point of lowest boiling VOC sought to be recovered. Cooling air temperature was in the range of 18–25° C. in both cases. The model VOC for those experiments was acetone.

FIG. 1 generally illustrates how carbon adsorption units are operated and regenerated in accordance with the prior art. In FIG. 1 the U1 unit, generally designated as 10, is undergoing regeneration and the U2 unit is on-line and adsorbing VOCS from VOC-laden process air via inlet 12' coming from the spinning cabinets and exits via line 14'. Referring now to U1, VOCS coming from a blower (not illustrated) enters U1 via inlet line 12 and exits U1 via line 14. When U1 reaches saturation, the flow of VOC-laden process air from the spinning cabinets is shut off and the low pressure steam (35 psia, plant scale) is admitted to U1 via line 20 in a manner countercurrent to the VOC flow via line 12. Steam and desorbed VOCS exit unit U1 via line 22 and are sent to a condenser (not illustrated) wherein the steam and condensable VOCS are condensed. If the condensed steam and water are immiscible, they are physically separated. If the solvent and condensed steam are miscible, the mixture is sent to a fractionation column for separation. In both instances, the recovered solvent is recycled in an appropriate manner and the water sent for disposal.

When steam stripping is completed, shutoff valve V1 is opened and U1 is cooled using part or all of the process air exiting from the on-line U2 unit. (VOC-laden air enters U2 via line 12'.) The process air exiting U1 is admitted to U2 via line 30 and exits via line 32. [Note: If all the process air from U2 is used to cool U1, then line 14' is closed by means of a shutoff valve V1 until cooling is completed, at which point the process air passing through line 30 is cut off by closing V2 and V1 is re-opened.] The process air is admitted to U1 such that the flow is in the same direction as was the VOC-laden air when U1 was on line. The unit is cooled with process air for a time sufficient for the carbon bed to reach ambient temperature, approximately 18–30° C. When cooling is completed is completed U1 may be returned on-line or held off-line until such time as U2 need regeneration.

Referring now to FIG. 2, the process according to the present invention, the process is similar to the prior art except for the following two items. First, cooling air is accomplished using atmospheric air and not process air from on-line unit U2. Second, the cooling air is passed through the unit in the same direction as the steam that was passed through the unit and not, as in the case of the prior art example described above, in the same direction as was the VOC-laden air during operation of U1. Therefore the regeneration process of the present invention is described as follows.

1. VOCS are admitted to U1 via line 112 and exit via line 114.
2. When the carbon bed of U1 has reached saturation, the VOC inlet and outlet as represented by 112 and 114 are closed, U1 is taken off-line, and U2 is placed on line.
3. After shutting off the VOCS from U1, low pressure steam is admitted to U1 via 120 and exits via 122. The steam and desorbed VOCS are condensed and the VOCS recovered as has been described above.
4. When steaming is completed, the steam inlet and outlines are closed and atmospheric cooling air, not unit U2 process air, is admitted via line 140 and exits via line 142. Cooling air is thus admitted and exits in the same direction as was the steam and not in the direction of the VOCS as was the case in the process of the prior art.
5. When cooling is completed, U1 is either returned on-line to replace U2 or is held in the ready position until such time as it is necessary to replace the then on-line unit U2.

Table 1, below, compares the results obtained using the regeneration process according to the present invention versus the regeneration process according to the prior art. Since cellulose acetate fiber and filament is produced using a solution which is about 20 weight percent cellulose acetate and 80 weight percent acetone, each one million pounds ($1 \times 10^6$ pounds) of fiber produced requires the use four million pounds ($4 \times 10^6$ pounds) of acetone. By increasing the percent acetone recovery by an additional 0.7% as indicated below, an additional 28,000 pounds of acetone is recovered. With annual worldwide cellulose acetate fiber and filament production capacity being about 800,000 metric tons (equal to approximately $17.6 \times 10^8$ pounds), virtually all of which uses acetone as the spinning solution solvent, the total additional acetone recovered using the process of the invention could approach $49.3 \times 10^6$ pounds.

TABLE 1

Pilot Plant Comparative Regeneration Results

| Acetone Admitted | | Acetone Recovered (Lbs.) | | Acetone Recovered (%) | |
|---|---|---|---|---|---|
| Prior Art | Invention | Prior Art | Invention | Prior Art | Invention |
| 100 lbs | 100 lbs | 98.9 lbs | 99.6 lbs | 98.9% | 99.6% |

Figure 3:
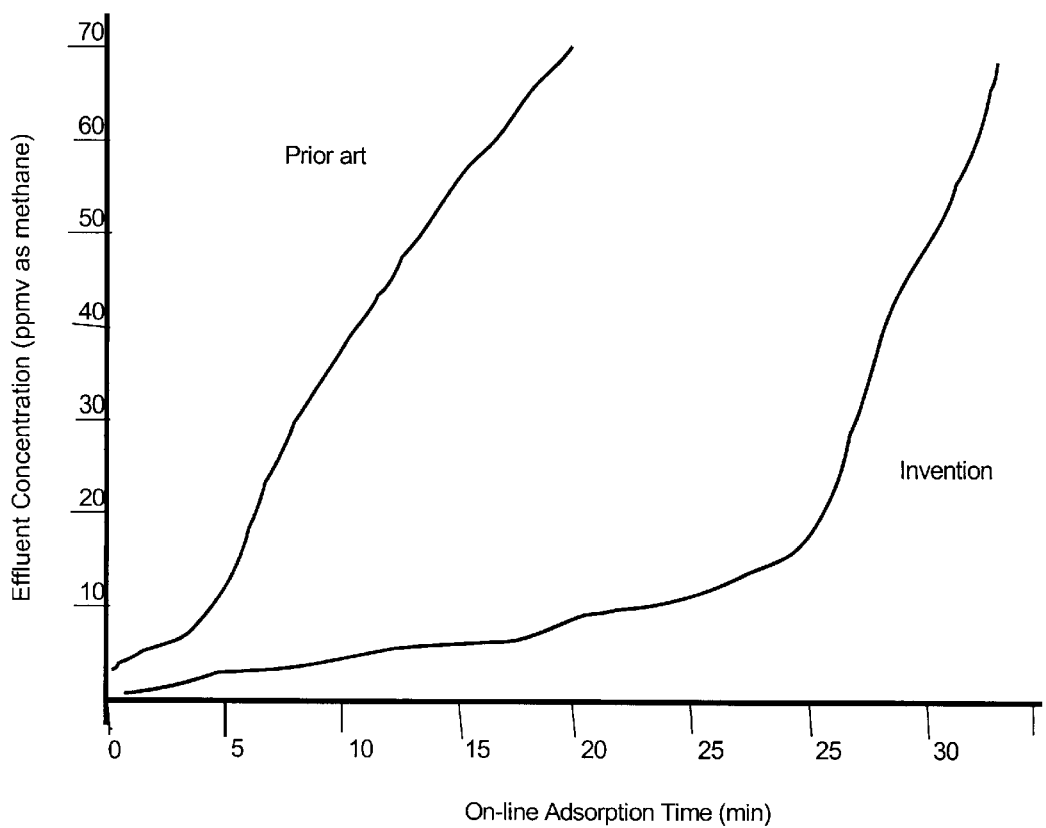
FIG. 3 illustrates, as a function of time, the volatile organic compounds contained in the effluent of carbon units regenerated according to the invention and the prior art.

FIG. 3 is a graph illustrating the measurement of VOC in an adsorption unit's effluent versus the time the unit is on-line. The graph indicates that the total on-line adsorption time for a unit regenerated in accordance with the invention is significantly longer than one regenerated according to the prior art. For example, effluent VOC reaches 20 ppmv (parts-per-million per unit volume) after about 7–8 minutes on-line for a unit regenerated according to the prior art, whereas when the unit is regenerated in accordance with the invention it takes about 23–25 minutes for the VOC in the effluent to reach this same level. Since much less frequent regenerations are required when they are carried out according to the invention, considerable cost savings can be achieved. Each curve represents an average of four different trials. Without being held to any particular theory, it is believed that reason for the improved adsorption of VOCS, and hence improved recovery of solvent, and lessening of the frequency of regenerations, is a combination of (a) cooling of the bed from the steam inlet side as opposed to the VOC inlet side as practiced in the prior art and (b) the use of atmospheric air as opposed to the prior art's use of process air from the then on-line adsorption unit. It is believed that this combination improves VOC adsorption in the "polishing section" of the bed, thus maximizing the total amount of VOC adsorbed and the length of time between regenerations. The "polishing" section is that part of the bed nearer the outlet, line 114, during the VOC adsorption part of the unit's cycle.

We claim:

1. A process for the recovery of a volatile organic compound from a gaseous process stream generated from a cellulose acetate spinning process comprises the steps of:

adsorbing the volatile organic compound onto an activated carbon in a fixed bed by passing, in a first direction, the gaseous process stream through the bed;

stopping passage of the stream when the activated carbon has reached a predetermined saturation level;

stripping the adsorbed volatile organic compound from the activated carbon by passing, in a second direction, steam through the bed, where the second direction is counter current to the first direction;

stopping the steam stripping; and cooling the desorbed activated carbon by passing, in the second direction, ambient atmospheric air through the bed.

2. The process according to claim 1, wherein the volatile organic compound having a boiling point of 100° C. or less.

3. The process according to claim 1, wherein said volatile organic compound being selected from the group consisting of acetone, methylene chloride, chloroform, and methyl ethyl ketone.

4. The process according to claim 1, wherein the steam having a temperature in the range of 30–180° C., a steam pressure in the range of 10–25 pounds over atmospheric pressure, and a stripping time in the range of 10 minutes to 1 hour.

* * * * *